United States Patent [19]

Katayama

[11] Patent Number: 5,515,350

[45] Date of Patent: May 7, 1996

[54] OPTICAL HEAD WITH ADJUSTABLE OUTPUT POWER DETECTOR

[75] Inventor: Hiroshi Katayama, Higashihiroshima, Japan

[73] Assignee: Sharp Kabushiki Kaisha, Osaka, Japan

[21] Appl. No.: 1,922

[22] Filed: Jan. 7, 1993

Related U.S. Application Data

[63] Continuation of Ser. No. 601,918, Oct. 22, 1990, abandoned.

[30] Foreign Application Priority Data

Nov. 2, 1989 [JP] Japan ..................................... 1-288323

[51] Int. Cl.⁶ ..................................................... G11B 7/00
[52] U.S. Cl. ............................................. 369/54; 369/116
[58] Field of Search ............................... 369/116, 54, 59, 369/47, 48, 50, 58, 124

[56] References Cited

U.S. PATENT DOCUMENTS

| | | | |
|---|---|---|---|
| 4,675,749 | 6/1987 | Banno et al. | 369/59 |
| 4,685,097 | 8/1987 | van der Put | 369/116 |
| 4,698,797 | 10/1987 | Komatsu | 369/116 |
| 4,706,236 | 11/1987 | Yoda | 369/59 |
| 4,785,443 | 11/1988 | Minami et al. | 369/116 |

FOREIGN PATENT DOCUMENTS

| | | |
|---|---|---|
| 145296 | 6/1985 | European Pat. Off. . |
| 208212 | 1/1987 | European Pat. Off. . |
| 223576 | 5/1987 | European Pat. Off. . |
| 385537 | 9/1990 | European Pat. Off. . |
| 2595857 | 9/1987 | France . |
| 60-187074 | 9/1985 | Japan . |
| 1-112533 | 5/1989 | Japan . |

Primary Examiner—Georgia Y. Epps
Assistant Examiner—P. W. Huber
Attorney, Agent, or Firm—Nixon & Vanderhye

[57] ABSTRACT

An optical head having a semiconductor laser that emits a laser beam, an optical system that leads the laser beam emitted by the semiconductor laser onto a recording medium, an optical power detector that detects the power of the laser beam emitted by the semiconductor laser, and a variable resistor that adjusts the detection output released by the optical power detector. The adjustment performed by the variable resistor enables to suppress readily the fluctuation of the detection output occurring with every optical head manufactured.

4 Claims, 3 Drawing Sheets

OPTICAL HEAD WITH ADJUSTABLE OUTPUT POWER DETECTOR

This is a continuation of application Ser. No. 07/601,918, filed Oct. 22, 1990, now abandoned.

FIELD OF THE INVENTION

The present invention relates to an optical head for use in optical information recording/reproducing devices. More particularly, it relates to an optical head capable of adjusting the detection output of an optical power detector employed for detecting the optical power of a semiconductor laser.

BACKGROUND OF THE INVENTION

As illustrated in FIG. 3, with a conventional optical head 21 used for recording or reproducing information on/from a recording medium, a laser beam emitted by a semiconductor laser 22 is converted into a parallel beam of light by a collimating lens 23 and is split into a transmitted beam and a reflected beam by a beam splitter 24. The transmitted beam is converged upon a recording medium 26 by means of an objective lens 25 and is employed for recording or reading information. As to the reflected beam, it impinges upon a photodiode 29 that is installed between and connected to output terminals 27 and 28, and here is converted into an electric signal. This electric signal is used as detection output for detecting the optical power of the semiconductor laser 22 to be sent by the optical head 21 to an external circuit.

It is a characteristic feature of the semiconductor laser 22 of the optical head 21 that the optical power thereof varies greatly due to changes in temperature, elapse of time, or according to the current applied thereto. In order to obtain a stable optical power, it is therefore indispensable to have a portion of the laser beam emitted by the semiconductor laser 22 received onto the photodiode 29 in a fixed proportion, and to adjust the optical power of the semiconductor laser 22 in accordance with the detection output released by the photodiode 29. Hence, in an optical information recording/ reproducing device, an APC (Auto Power Control) circuit, not shown, is usually accommodated outside of the optical head 21 and, using the detection output of the photodiode 29, the optical power of the semiconductor laser 22 is adjusted by means of the APC circuit so that a laser beam having a suitable light intensity is converged upon the recording medium 26.

However, the following difficulty arises when manufacturing the conventional optical head 21. That, is, the detection output that the photodiode 29 releases is different in every optical head 21 manufactured making it difficult to accurately adjust the optical power of the semiconductor laser 22 by means of the APC circuit. The reason why the detection output released by the photodiode 29 varies will be discussed hereinbelow.

The optical head 21 used for recording requires a strong light to perform the recording of information. Consequently, in order to obtain a laser beam having a high power of approximately 5 mW to 15 mW, provision is usually made such that the transmittance of the beam splitter 24 is high and the laser beam emitted by the semiconductor laser 22 is efficiently illuminated upon the recording medium 26. This is due to the fact that, under present mass production conditions, the maximum output of the semiconductor laser 22 is at most approximately equal to 40 mW. It is therefore not possible to obtain a laser beam of a high power unless the beam splitter 24 has a high transmittance.

Here, supposing that the light intensity of the portion of the laser beam that was transmitted through the beam splitter 24 is represented by $I_t$, the light intensity I of the portion of the laser beam that was reflected by the beam splitter 24 and impinges upon the photodiode 29 is determined by the transmittance T and the reflectance R of the beam splitter 24 according to the following equation:

$$I = I_t \times R/T$$

With the present mass production technology, it is difficult to contain the accuracy of the transmittance T and the reflectance R below ±5%. For instance, the transmittance T of the beam splitter 24 accommodated in the optical head 21 used for recording is generally equal to 0.7±0.05, and its reflectance R is generally equal to 0.3±0.05. Consequently, according to the above equation, the light intensity I is equal to:

$$I = (0.43 \pm 0.1) \times I_t$$

or, if put in terms of a fluctuation range, can extend to as much as ±23%. In other words, supposing that the light intensity $I_t$ is constant, a discrepancy of 1.6 times occurs between the greatest and the smallest detection signals released by the photodiode 29 of the optical head 21. The light intensity $I_t$ stands in proportional relationship to the light intensity of the laser beam irradiated on the recording medium 26. Hence, when a predetermined recording optical power or a predetermined reproduction optical power has been set with respect to the recording medium 26, the detection output released by the photodiode 29 varies with every optical head 21 within the above fluctuation range.

When the optical head 21 is adopted for recording information on the recording medium 26, the intensity of the light coming out from the objective lens 25 needs to be 5 to 10 times that of reproduction. Therefore, it is a prerequisite that no saturation occurs in any of the circuits following the photodiode 29 in order to correctly control the intensity of the light going out from the objective lens 25 during recording. The photodiode 29 has a wide dynamic range and usually does not get saturated, but circuits connected to the photodiode 29 such as the APC circuit, etc. are not able to release outputs above the power source voltage. This point needs to be taken in consideration when designing the circuitry, i.e. the gain of the APC circuit needs to be set such that the emission of a laser beam having a high power during recording does not cause the saturation of the circuit.

Consequently, when as described earlier, the detection output released by the photodiode 29 varies greatly, the gains of circuits such as the APC circuit, etc. need to be set such that no saturation occurs, for the optical head 21 where the detection output released by the photodiode 29 is maximal. On the other hand, efficient use cannot be made of the dynamic range of the above circuits in the optical head 21 where the detection output released by the photodiode 29 is minimal. Namely, if in the optical head 21 the detection output is minimal, the detection output released by the photodiode 29 during reproduction is of a low level and has a low S/N whereby the optical power of the semiconductor laser 22 cannot be adjusted as desired. Moreover, when the detection output released by the photodiode 29 is converted from an analog signal into a digital signal and the optical power of the semiconductor laser 22 is digitally controlled, the accuracy in setting the optical power of the semiconductor laser 22 drops significantly in the optical head 21 where the detection output of the photodiode 29 is small, due to a low resolution per bit.

In addition, lately, efforts for improving the transmission rate of data have given rise to the need for enhancing the transmittance of the beam splitter 24 and thereby increasing the intensity of the light illuminated from the objective lens 25 onto the recording medium 26. However, since it is difficult to contain the accuracy of the transmittance and the reflectance of the beam splitter 24 below ±5% as mentioned earlier, this would further increase the fluctuation of the detection output released by the photodiode 29. The conventional optical head 21 thus suffers from the drawback that practically it is difficult to improve the transmission rate of data.

Here, in order to solve problems such as described above, one might think of adjusting the gain of the APC circuit for every optical head 21 manufactured. This requires a procedure for adjusting the gain to be added to the manufacturing process and causes the APC circuit to lose its flexibility. Furthermore, when the optical head 21 is replaced during the maintenance performed after delivery, the above arrangement suffers from the drawback that the gain of the APC circuit needs to be adjusted for the newly installed optical head 21.

SUMMARY OF THE INVENTION

An object of the present invention is to provide an optical head capable of adjusting the detection output released by an optical power detector employed for detecting the intensity of the light illuminated on a recording medium.

Another object of the present invention is to provide an optical head permitting to omit the process of adjusting the gain of an APC circuit during the manufacturing process of the optical head.

In order to achieve the above objects, an optical head comprises a semiconductor laser that emits a laser beam, an optical system for leading the light emitted by the semiconductor laser to a recording medium, an optical power detector for detecting the power of the light emitted by the semiconductor laser, and detection output adjusting means for adjusting a detection output released by the optical power detector.

The detection output adjusting means may be designed such as to mainly adjust electrically the detection output released by the optical power detector, or may also be designed such as to adjust the intensity of the laser beam impinging upon the optical power detector.

With the above arrangement, even if the detection output released by the optical power detector varies with every optical head due to the accuracy of the optical system, the implementation of the detection output adjusting means permits to adjust the detection output released by the optical power detector employed for detecting the intensity of the light emitted by the optical head. Such an arrangement thus enables to prevent the detection output released by the optical power detector from fluctuating thereby permitting to eliminate the need for adjusting the gain of the APC circuit during the manufacturing process of the optical head. As a result, the cost increase caused by adjusting the gain of the APC circuit may be restrained and the maintenance, such as the replacement of the optical head, etc. may be facilitated. In addition, the wide dynamic range of the APC circuit may efficiently be made use of, and the power of the light emitted by the semiconductor laser may be controlled in a highly accurate manner according to a detection output having a satisfying signal-to-noise ratio.

The above arrangement may also be adopted for eliminating through the action of the detection output adjusting means, the fluctuation of the detection output released by the optical power detector caused by factors other than the accuracy of the optical system.

For a fuller understanding of the nature and advantages of the invention, reference should be made to the ensuing detailed description taken in conjunction with the accompanying drawings.

DETAILED DESCRIPTION OF THE EMBODIMENTS

An embodiment of the present invention will be discussed hereinbelow with reference to FIG. 1.

Figure 1:
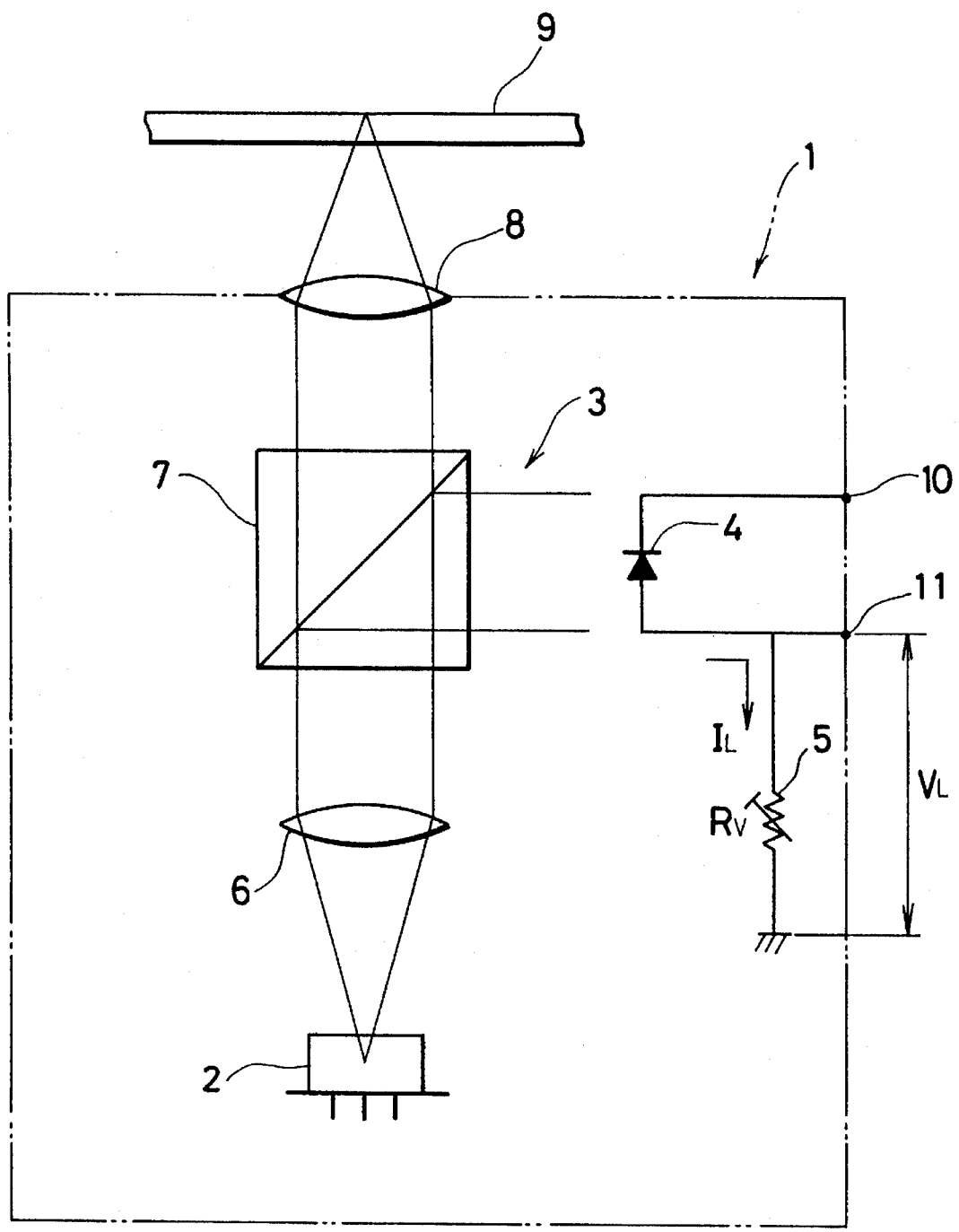
FIG. 1 is an explanatory view illustrating an embodiment of the present invention and shows the configuration of an optical head.

As illustrated in FIG. 1, an optical head 1 of the present embodiment comprises a semiconductor laser 2, an optical system 3, a photodiode 4 serving as optical power detector, and a variable resistor 5 serving as detection output adjusting means.

The optical system 3 is composed of a collimating lens 6 that converts the laser beam emitted by the semiconductor laser 2 into a parallel beam of light, a beam splitter 7 that, after the laser beam passed through the collimating lens 6, transmits the laser beam with a predetermined transmittance and reflects it with a predetermined reflectance, and an objective lens 8 that converges upon a recording medium 9 the part of the laser beam that was transmitted through the beam splitter 7.

The photodiode 4 is arranged such that the cathode thereof is connected to an output terminal 10 and the anode thereof is connected to an output terminal 11, and is grounded via the variable resistor 5. The photodiode 4 is placed at a position where it is capable of receiving the part of the laser beam that was reflected by the beam splitter 7. The variable resistor 5 is designed such that its resistance value $R_V$ can be adjusted within a given range so as to cancel the fluctuation of the detection output released by the photodiode 4 occurring with every optical head 1 when the optical head 1 is mass-produced.

With the above arrangement, the laser beam emitted by the semiconductor laser 2 is converted into a parallel beam of light by the collimating lens 6. The part of the laser beam that passed through the beam splitter 7 is then converged onto the recording medium 9 by the objective lens 8, while the part of the laser beam that was reflected by the beam splitter 7 impinges upon the photodiode 4 that then produces a photocurrent $I_L$. The photocurrent $I_L$ further flows into the variable resistor 5 causing a definite detection output determined by:

$$V_L = I_L \times R_V$$

to be generated in the output terminal 11.

Here, the value of the resistor $R_V$ should be set such as to be suitable for the circuit that is connected to and follows the variable resistor 5, and that is accommodated in the main body of the device carrying the optical head 1. In addition, the gain of the above circuit should preliminary be adjusted for the detection output $V_L$ so that no saturation occurs therein during recording.

Such an arrangement enables to obtain a definite detection output $V_L$ irrespectively of the differences between each optical head 1, as the detection output $V_L$ can be adjusted by means of the variable resistor 5.

Another embodiment of the present invention will be discussed hereinbelow with reference to FIG. 2.

Figure 2:
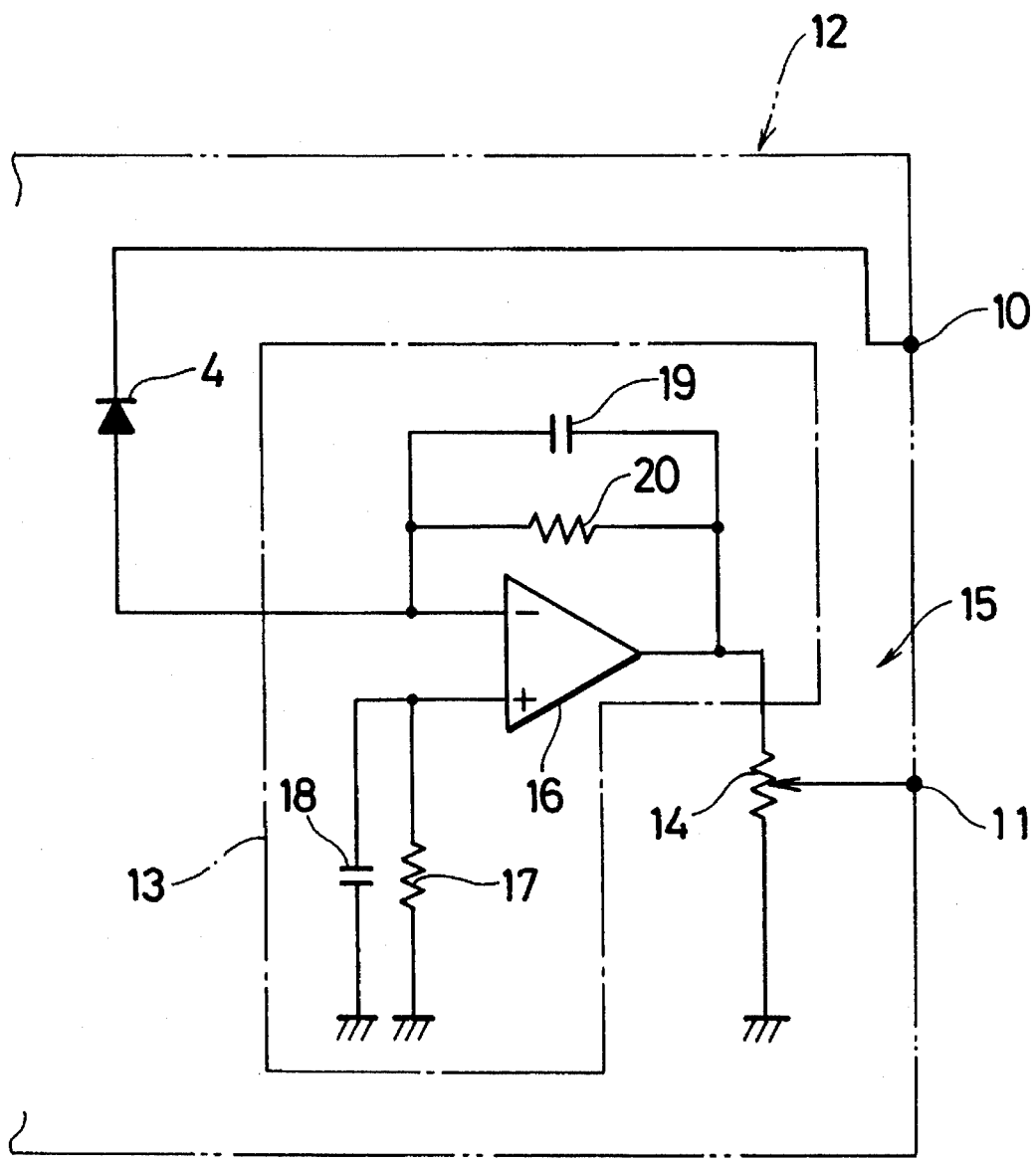
FIG. 2 is a circuit diagram illustrating another embodiment of the present invention and shows the configuration of detection output adjusting means installed in an optical head.
Figure 3:
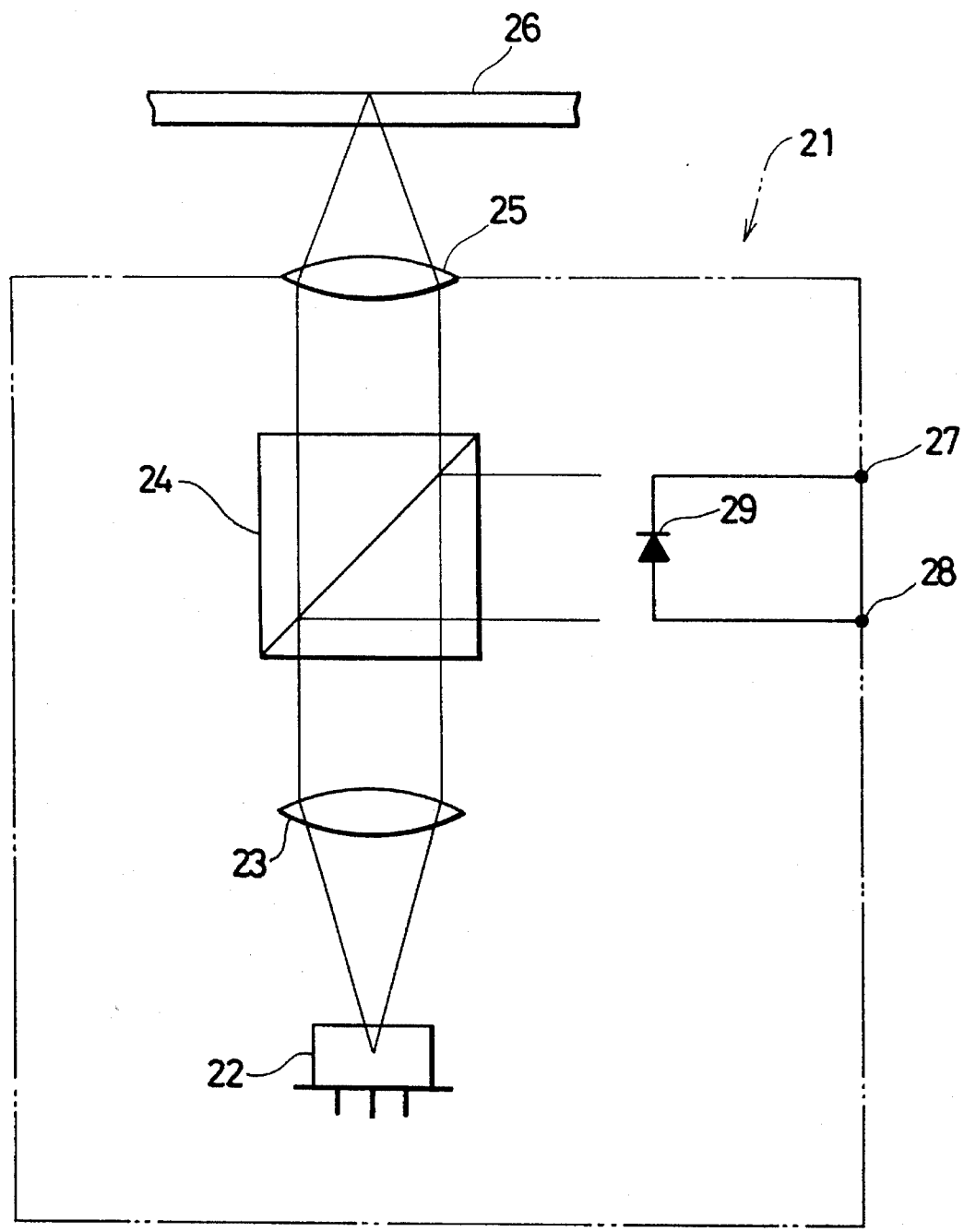
FIG. 3 is an explanatory view illustrating a conventional example and shows the configuration of an optical head.

The semiconductor laser 2 and the optical system 3 are not shown in FIG. 2 and their description will be omitted as they are disposed in the same manner as in the previous embodiment illustrated in FIG. 1. In addition, the members having the same function than in the aforementioned embodiment will be designated by the same code and their description will be omitted.

As illustrated in FIG. 2, an optical head 12 of the present embodiment comprises a detection output adjusting means 15 composed of a current-to-voltage conversion circuit 13 and a variable resistor 14. The optical head 12 is designed such that the cathode of the photodiode 4 is connected to the output terminal 10, and the anode of the same is connected to the inverting input terminal of an operational amplifier 16 housed in the current-to-voltage conversion circuit 13. The non-inverting input terminal of the operational amplifier 16 is grounded via a resistor 17 and a capacitor 18, the capacitor 18 being mounted in parallel with the resistor 17. In addition, a capacitor 19 and a resistor 20 are mounted in parallel and disposed between the inverting input terminal and the output terminal of the operational amplifier 16. The output terminal of the operational amplifier 16 is grounded via the variable resistor 14 whose adjustable terminal is connected to the output terminal 11 of the optical head 12.

As in the previous embodiment, this arrangement enables the detection output of the photodiode 4 to be adjusted by means of the variable resistor 14. However, the present embodiment differs from the previous one in that the current-to-voltage conversion circuit 13 is disposed between the photodiode 4 and the variable resistor 14 and in that the photocurrent produced by the photodiode 4 that flows into the inverting input terminal of the operational amplifier 16 is converted into a voltage. The optical head 12 of the present embodiment thus presents the advantage that the frequency bandwidth may be set as desired in the current-to-voltage conversion circuit 13.

In the previous and present embodiments, provision was made such that the detection output released by the photodiode 4 is adjusted electrically. However, the present invention is not limited to these examples and the detection output released by the photodiode 4 may also be adjusted optically. A filter or other member may for example be inserted in the section of the photodiode 4 whereon the laser light impinges.

Further, the previous and present embodiments adopted methods of detecting the optical power released by the semiconductor laser 2 by means of the laser light split by the beam splitter 7, but other methods may as well be employed. The optical power of the semiconductor laser 2 may, for example, be detected by installing a pin photodiode within a package housing the semiconductor laser 2 and employing it as photodetector.

As described above, an optical head in accordance with the present invention comprises detection output adjusting means for adjusting the detection output released by an optical power detector. The fluctuation of the detection output released by the optical power detector occurring with every optical head due to the accuracy of the optical system or to other reason, may be thus eliminated by adjusting the detection output of the optical power detector through the detection output adjusting means. As a result, there is no need for adjusting the gain control of an APC circuit and the cost increase due to the adjustment of the gain of the APC circuit during manufacturing may be suppressed. Besides, when during maintenance the need for replacing the optical head arises, the detection output released by the optical power detector can be adjusted readily through the detection output adjusting means and there is no necessity of executing a laborious gain adjustment. In addition, efficient use can be made of the wide dynamic range of the APC circuit and the optical power of the semiconductor laser may be controlled in a highly accurate manner according to a detection output having a satisfying signal-to-noise ratio.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. In a system for optically recording and reproducing information including a power control unit and a separate optical head unit electrically connected to the power control unit and movable with respect to an optical storage medium, the optical head unit comprising:

a laser for emitting a laser beam;

an optical system that directs the emitted laser beam onto the optical storage medium;

an optical power detector that detects the power of the laser beam emitted by the laser and generates a detection output; and means for adjusting the optical power detector, wherein the power control unit controls the optical power of the laser and the means for adjusting included in the optical head unit adjusts the optical power detector independently of the power control unit.

2. The system as defined in claim 1, wherein:

said optical power detector is a photodiode that produces a photocurrent when illuminated by a light from said optical system; and said detection output adjusting means is a variable resistor that is connected to an anode of said photodiode, and that emits said detection output derived from said photocurrent.

3. The system as defined in claim 1, wherein:

said optical power detector is a photodiode that produces a photocurrent when illuminated by a light from said optical system; and said detection output adjusting means comprises a current-to-voltage conversion circuit where a current produced by said photodiode is converted into a voltage, and a variable resistor that adjusts an output released by said current-to-voltage conversion circuit and emits said detection output.

4. The system as defined in claim 3, wherein said current-to-voltage conversion circuit comprises:

an operational amplifier provided with an inverting input terminal, a non-inverting input terminal and an output terminal;

a resistor and a capacitor mounted in parallel and connected to the non-inverting input terminal; and a capacitor and a resistor mounted in parallel between the inverting input terminal and the output terminal.

* * * * *